Aug. 23, 1932.  R. K. LEE  1,872,763

VIBRATION DAMPENER

Filed Jan. 24, 1927

INVENTOR
ROGER K. LEE
BY
ATTORNEY

Patented Aug. 23, 1932

1,872,763

UNITED STATES PATENT OFFICE

ROGER K. LEE, OF DETROIT, MICHIGAN, ASSIGNOR TO CHRYSLER CORPORATION, OF HIGHLAND PARK, MICHIGAN, A CORPORATION OF DELAWARE

VIBRATION DAMPENER

Application filed January 24, 1927. Serial No. 163,120.

This invention relates to internal combustion engines and more particularly to the construction of a device for eliminating certain torsional vibration.

The crankshaft of an internal combustion engine has a fixed rate of vibration whether it is rotating or dormant, the rate in cycles per second being a function of the moment of inertia of the crankshaft and its rigidity. The amplitude of vibration is determined by the resultant turning effort transmitted through the crankshaft and by the phase relation of impulses to the natural rate of vibration of the crankshaft. Maximum vibration occurs when the inertia forces synchronize with each alternate movement of the crankshaft of each cycle, vibrating at its natural rate. The inertia forces, at maximum speed, are by far the predominant factor as such forces increase as the square of the speed. Other synchronous periods occur as the speed decreases, as for example, at one half the maximum speed, the torque impulses, of which the explosion pressure forms the predominating factor, come into synchronism with every second cycle of movement of the crankshaft vibrating at its natural rate and so on down the speed range as the torque impulses synchronize with a multiple of the natural rate of vibration of the crankshaft. Thus, it is evident that while the natural rate of oscillation of the crankshaft is the same at all speeds, the amplitude varies with the speed and intensity of the torque impulses.

It is therefore an important object of this invention to eliminate synchronous torsional vibration in shaft by means of a torsional pendulum, the natural period of which bears a predetermined relation to the natural period of the crankshaft in combination with a friction device adapted to change the friction with the amplitude of movement. Since friction does not change the rate of vibration of the torsional pendulum, it is possible to make the relation of that frequency to that of the crankshaft, such that, due to the lag of the pendulum phase behind the crankshaft phase, a natural opposition of forces is set up which tends to hold the synchronous movement of the crankshaft to a minimum.

Another object of the invention is to provide a dampener having an inertia member adapted to rotate with the crankshaft and free for limited angular movement therewith, so that the torsional impulses, whether caused by inertia forces or power impulses, cause relative angular movement between the inertia member and the crankshaft.

A further object of the invention is to restrict the amount of relative angular movement between the crankshaft and the inertia member by friction means and to return the inertia member to its normal position by that means, thus permitting the inertia member to momentarily slip in relation to the crankshaft, at the time of each torsional impulse or inertia force, and to immediately return it to its normal position after the impulse; the normal position varying in relation to the speed of crankshaft rotation.

These and other objects will more fully appear from the following description taken in connection with the accompanying drawing in which.

Figure 4:
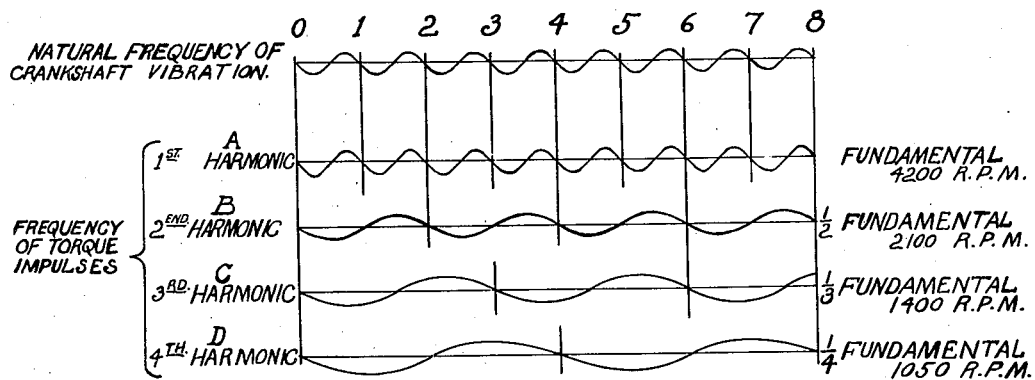
Fig. 4 is a diagrammatic view illustrating the different periods of synchronism in a crankshaft.

By way of illustrating the different synchronizing periods, in Fig. 4 the natural frequency of the crankshaft has been shown by the upper line, covering eight cycles. The frequency of the torque impulses is illustrated by lines A, B, C and D, the frequency of each varying with the speed of rotation. Line A, which may be termed the first harmonic, comes into phase with each alternate movement of each cycle, indicated by the vertical lines 1 to 8 inclusive. Line B, the second harmonic, comes into phase with every other cycle, indicated by the vertical lines 2, 4, 6 and 8. Line C, the third harmonic, comes into phase as indicated by lines 3 and 6, and line D, the fourth harmonic synchronizes or comes into phase with each fourth cycle.

Figure 1:
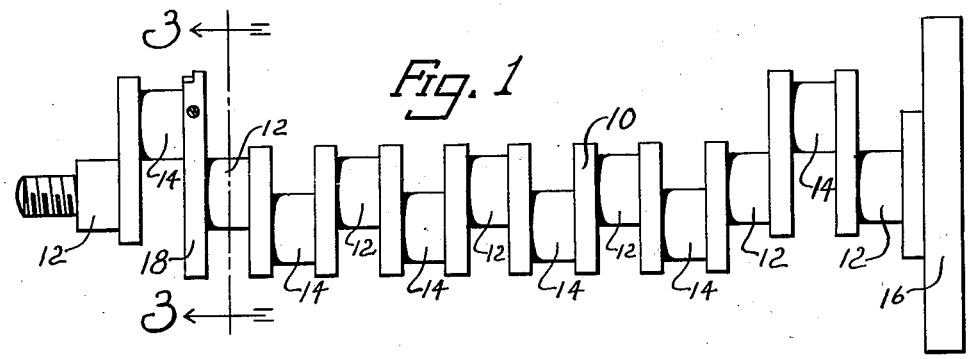
Fig. 1 is a side elevation of a crankshaft showing an adaptation of my invention.

Referring to Fig. 1, a crankshaft 10 has been shown having main bearings 12, connecting rod bearings 14 and a flywheel 16. At the forward end of the crankshaft, or adjacent the end opposite the flywheel, a vibration dampener 18 has been shown carried by the crankshaft, preferably on the second cheek between the first connecting rod bearing and the second main bearing.

Figures 2, 3:
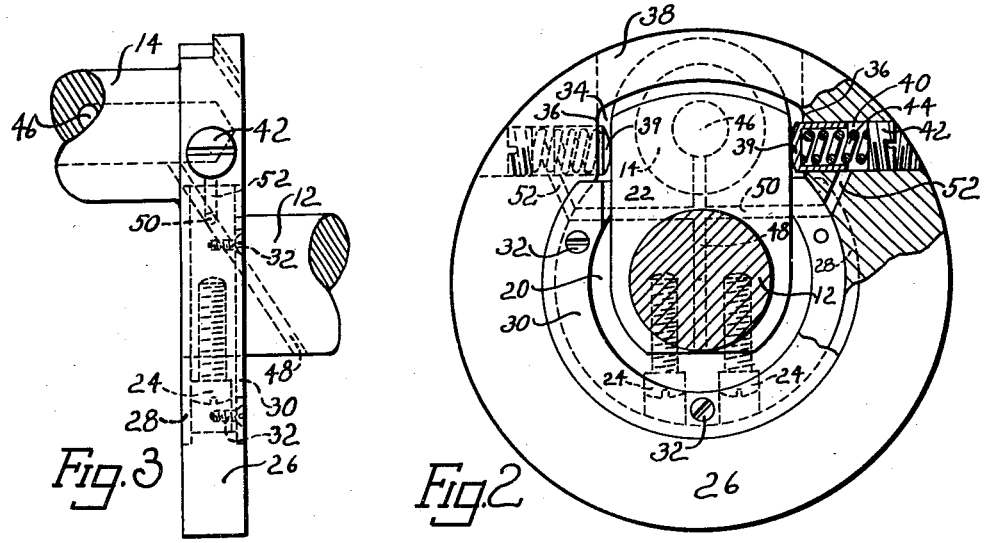
Fig. 2 is an enlarged sectional view through the crankshaft showing my invention, parts being broken away.
Fig. 3 is a side elevation of Fig. 2.

Referring particularly to Figs. 2 and 3, a cylindrical bearing 20 has been attached to a flange or cheek 22 by means of screws 24. An inertia member 26 in the form of a torsional pendulum is carried by the bearing 20, laterally supported by flanges 28 and 30, one of which is detachable to permit assembly. Screws 32 are shown securing the flange 30 to the bearing 20 and the inertia member 26 is carried in the groove formed by the flanges 28 and 30 and the bearing 20.

The upper portion of the inner periphery of the inertia member has been relieved or broken away as at 34 to permit angular movement of the inertia member around the bearing 20 or the center of crankshaft rotation. Lateral walls 36 are spaced from the sides of the cheek 22, and a portion 38 extending over the cheek 22 forms a continuous annular inertia member.

Projecting from the walls 36 are plungers or pistons 39, adapted to engage the side walls of the cheek 22, reciprocating in bores or cylinders 40. The outer end of the cylinder 40 is screw threaded to receive a screw 42. A spring 44, between the piston 39 and screw 42, resiliently urges the piston against the side of the cheek 22 moving the inertia member 26 angularly on the axis of crankshaft rotation. A like construction on the opposite side retains the inertia member in central position, one spring opposing the other.

It will be understood that the impulses of the crankshaft cause the inertia member to lag thus breaking up the synchronism of torsional vibration.

As a means for varying the friction with the amplitude of movement lubricant has been supplied to the cylinder 40 which forms in effect a dash pot for resisting the reciprocating movement of the piston 39 and consequent angular movement of the inertia member 26. The lubricant is supplied from the lubricant passages of the crankshaft, such passages being common in forced feed lubricating devices for the crankshaft, shown as passages 46 and 48.

Communicating with the passage 48, a passage 50 has been provided extending transversely through the crankshaft cheek 22 and bearing 20. The opposite ends of the passage 50 register with passages 52 in the inertia member 26. The passages 50 are positioned in such a manner that their openings, in the cylinders 40, are partially restricted by the inner edge of the pistons 39, thus forming a valve, the opening of which is restricted more and more as the piston is pressed in the cylinder 40. The backward movement of the piston is not only restricted by the spring 44 but by the variable resistance of the lubricant in the chamber 40, caused by the piston 39 changing the size of the opening to the passage 52. Thus the friction is increasingly changed with the amplitude of movement of the shaft. Due to the lag of the pendulum or inertia member phase behind the crankshaft phase, a natural opposition of forces is set up which tends to hold the synchronous movement of the crankshaft to a minimum.

While I have illustrated one practical adaptation of my invention, it will be understood that various changes may be made without departing from the spirit of my invention and it is not my intention to limit its scope other than by the terms of the appended claims.

What I claim is:

1. In a vibration dampener of the class described comprising, a crankshaft, an inertia member rotatable with said crankshaft having angular pendulum like movement with respect to said crankshaft, and fluid pressure means for progressingly restricting the pendulum like movement of said inertia member.

2. In a vibration dampener of the class described comprising, a crankshaft, a torsional pendulum in frictional engagement with said crankshaft and rotatable therewith having limited angular movement with respect to said crankshaft, the natural period of vibration of said pendulum having a predetermined relation to the natural period of the crankshaft, and fluid pressure means adapted to progressingly change the friction with the amplitude of movement.

3. In a vibration dampener of the class described comprising, a crankshaft, a torsional pendulum in frictional engagement with said crankshaft rotatable therewith and having limited angular movement with respect thereto, and fluid pressure means adapted to progressingly change the friction with the amplitude of movement.

4. In a vibration dampener of the class described comprising, a crankshaft having connecting rod bearings and main bearings, flanges connecting said bearings, a cylindrical bearing carried by one of said flanges coaxial with said main bearings, an inertia member having portions adjacent the side of said flanges beyond said cylindrical portion angularly movable on said cylindrical bearing, said angular movement being limited by the sides of said flange, and resilient means between said inertia member and said flange.

5. In a vibration dampener of the class described comprising, a crankshaft having connecting rod bearings and main bearings, flanges connecting said bearings, a cylindrical bearing carried by one of said flanges coaxial with said main bearings, an inertia member having a portion adapted to fit said cylindrical bearing and portions adjacent the sides of said flange, and resilient means between said last named portions and the sides of said flanges to resist angular movement of said inertia member on said cylindrical bearing.

6. In a vibration dampener of the class described comprising, a rotatable member, a member rotatable with said first named member having relative angular movement with respect thereto and coaxial therewith, resilient means between said members for resisting relative angular movement, and means adapted to change the resistance with the amplitude of movement.

7. In a vibration dampener of the class described comprising a crankshaft, a cylindrical bearing coaxial with said crankshaft, an inertia member carried by said cylindrical bearing angularly movable thereon and rotatable with said crankshaft, means for resisting relative angular movement between said crankshaft and said inertia member, and fluid pressure means for progressingly varying the resistance with the amplitude of movement.

8. In a vibration dampener of the class described comprising, a crankshaft having connecting rod bearings and main bearings, flanges connecting said bearings, a cylindrical bearing carried by one of said flanges coaxial with said main bearing, an inertia member having a portion adapted to fit said cylindrical bearing and portions adjacent the sides of said flange, cylinders in said inertia member, plungers in said cylinders for engagement with the sides of said flanges, means for supplying a fluid to said cylinders to urge said plungers against said flange, and means dependent on the amplitude of movement for varying the amount of pressure in said cylinders.

9. In the combination of a crankshaft having connecting rod bearings and main bearings, cheeks connecting said bearings, a cylindrical bearing on one of said cheeks, an inertia member mounted on said cylindrical bearing rotatable with said crankshaft and having angularly pendulum like movement movable with respect to said crankshaft, resilient means for restricting the pendulum like movement of the inertia member, lateral flanges on said inertia member extending beyond said cylindrical bearing, and radial flanges on said cylindrical bearing for laterally supporting said inertia member.

10. In the combination of a crankshaft having connecting rod bearings and main bearings, cheeks connecting said bearings, a cylindrical bearing on a portion of one of said cheeks, an inertia member mounted on said cylindrical bearing rotatable with said crankshaft and angularly movable with respect thereto, lateral flanges on said inertia member extending beyond said cylindrical bearing, resilient means for restricting the angular movement of said inertia member, and radial flanges on said cylindrical bearing for laterally supporting said inertia member, one of which is detachable for the purpose of assembly.

ROGER K. LEE.